United States Patent [19]

Zhou

[11] Patent Number: 5,072,115

[45] Date of Patent: Dec. 10, 1991

[54] INTERPRETATION OF MASS SPECTRA OF MULTIPLY CHARGED IONS OF MIXTURES

[75] Inventor: Xiao-Guang Zhou, Hayward, Calif.

[73] Assignee: Finnigan Corporation, San Jose, Calif.

[21] Appl. No.: 628,461

[22] Filed: Dec. 14, 1990

[51] Int. Cl.[5] ........................ B01D 59/44; H01J 49/00

[52] U.S. Cl. .................................... 250/281; 250/282; 250/252.1

[58] Field of Search ................. 250/281, 282, 252.1 R

[56] References Cited

U.S. PATENT DOCUMENTS

| | | | |
|---|---|---|---|
| 4,207,465 | 6/1980 | Faure et al. | 250/282 |
| 4,259,573 | 3/1981 | Prober et al. | 250/282 |
| 4,495,413 | 6/1985 | Lerche et al. | 250/252.1 |
| 4,507,555 | 3/1985 | Chang | 250/281 |
| 4,529,879 | 7/1985 | Schmit | 250/281 |
| 4,931,639 | 6/1990 | McLafferty | 250/282 |
| 4,933,547 | 6/1990 | Cody | 250/282 |
| 4,978,852 | 12/1990 | Williams | 250/282 |

*Primary Examiner*—Bruce C. Anderson
*Attorney, Agent, or Firm*—Flehr, Hohbach, Test, Albritton & Herbert

[57] ABSTRACT

A chemical mixture is conveyed to a multiple charging apparatus, where multiply charged ions are formed. The multiply charged ions are then conveyed to a mass spectrometer which generates mass/charge spectrum data relating intensity to a range of mass/charge values. This mass/charge spectrum data is transformed to generate mass spectrum data relating intensity to a range of mass values. Thereafter, a set of known masses are identified from the mass spectrum data by associating each peak intensity value in the spectrum with its molecular mass. Then a list of mass/charge ratios for each of the identified masses is formed and stored. Next, a range of mass/charge ratios for each mass value of the mass spectrum data is computed. Identification spectrum data is then computed by assigning a value to the identification spectrum from the mass/charge spectrum data: (1) for mass/charge spectrum data corresponding to known masses; and (2) for mass/charge spectrum data which does not correspond to known masses and which does not correspond to a value in the list. Mass values associated with peak intensity values of the resultant identification spectrum are then identified and added to the a list of the known mass values. These steps are repeated under computer control to identify a plurality of mass values.

20 Claims, 10 Drawing Sheets

INTERPRETATION OF MASS SPECTRA OF MULTIPLY CHARGED IONS OF MIXTURES

BRIEF DESCRIPTION OF THE INVENTION

This invention relates generally to mass spectrometry. More particularly, it relates to a method and apparatus for interpreting the mass spectra of multiply charged ions of mixtures.

BACKGROUND OF INVENTION

Mass spectrometers are well known in the art. To this juncture, mass spectrometers have utilized ionization methods in which the parent molecule lost or gained an electron, thereby resulting in a singly charged species.

There are a number of shortcomings associated with this prior art approach. First, electronic detection is difficult to achieve for those ions with a high mass-to-charge (m/z) ratio. Similarly, since most ions are singly charged, the mass range of the analyzer is limited.

Methods have been discovered which produce neutral parent molecules supporting multiple cations or anions. These new methods are disclosed in Dole, et al., *Molecular Beams of Macroions*, J. Phys. Chem., 1968, 49, 2240–2249. Particularly, electrospray (ES) technology has proven to be especially successful in creating multiple charging. This technique is disclosed in Yamashita, et al., Electrospray Ion Source. Another variation on the *FreeJet Theme*, J. Phys. Chem., 1984, 88, 4451–4459.

In accordance with these techniques, a mass spectrometry apparatus typically includes a number of elements: a liquid sample introduction device, a multiple charging apparatus, a mass spectrometer, and a data processing system.

The techniques associated with such an apparatus facilitates the formation of ions containing multiple adduct charges. As a result, ions have lower m/z values and thus are easier to detect and weigh than singly charged ions of the same mass, as done in the prior art. This technique extends the effective mass range of the analyzer by a factor equal to the number of charges per ion.

While this technique clearly has substantive advantages, it is difficult to interpret the resultant output. A plot of intensity versus m/z ratios results in a spectrum with multiple peaks.

Fenn, et al, *Interpretinq Mass Spectra of Multiply Charged Ions*, Anal. Chem. 1989, 61, 1702–1708 have done considerable work in interpreting such data. This paper is expressly incorporated by reference herein.

As explained in Fenn, resultant spectrums comprise a sequence of intensity peaks approximating a Gaussian distribution. Other general features include a width of approximately 500 on the m/z scale. This distribution is often centered at a value between 800 and 1200.

The individual peaks of an intensity versus m/z ratio spectrum represent the constituent ions. The number of charges on constituent ions for each peak differs from an adjacent peak by one elementary charge.

Fenn discloses an algorithm, referred to as "deconvolution" in the paper, which transforms the sequence of peaks for multiply charged ions to one peak located at the molecular mass M of the parent compound. Thus, the information possessed in the multiple peaks is greatly simplified into one peak corresponding to a molecular mass.

While an advance in the art, Fenn's approach has problems analyzing mixtures of components. This shortcoming arises because of the mutual interference of "side peaks" generated from different components in the transformed spectrum. A problem arises in determining whether such side peaks are a result of interference or represent a molecular mass. This problem is especially acute when one major compound dominates over the others, and thereby may conceal other molecular masses in the mixture being analyzed.

OBJECTS OF THE INVENTION

It is therefore the principal object of this invention to provide an improved method for interpretation of mass spectra of multiply charged ions in mixtures.

It is a more particular object of this invention to provide a method for discovering a multiplicity of molecular masses from mass-to-charge ratio data corresponding to multiply charged ions.

It is another object of the present invention to provide a method for eliminating artificial side peaks associated with a transformed spectrum.

Yet another object of the present invention is to preserve true molecular mass peaks in a transformed spectrum while exposing additional components in the transformed spectrum.

Another object of the present invention is to generate a single peak for a parent molecular mass, without extraneous artifacts.

These and other objects are achieved by a method and apparatus for identifying the molecular masses of multiply charged ions in a chemical mixture. The method comprises a number of steps. First, the chemical mixture is conveyed to a multiple charging apparatus, where multiply charged ions are formed. The multiply charged ions are then conveyed to a mass spectrometer which generates mass/charge spectrum data relating intensity to a range of mass/charge values. This mass/charge spectrum data is stored in a computer and processed to generate mass spectrum data relating intensity to a range of mass values. The mass spectrum data is also stored in a computer. Thereafter, a mass is identified from the mass spectrum data. Then a list of mass/charge ratios for the identified mass is formed and stored. The values in this list comprise the points in the mass/charge spectrum which belong to the known mass in the chemical mixture being analyzed. Next, a range of mass/charge ratios for each mass value of the mass spectrum data is computed. Identification spectrum data is then computed by assigning a value to the identification spectrum from the mass/charge spectrum data: (1) for mass/charge spectrum data corresponding to a known mass; and (2) for mass/charge spectrum data which does not correspond to a known mass and which does not correspond to a value in a computed list. A mass value is then identified from the resultant identification spectrum. The identified mass is then added to the set of known mass values. These steps are repeated under computer control to identify a plurality of mass values.

BRIEF DESCRIPTION OF THE FIGURES

Other objects and advantages of the invention will become apparent upon reading the following detailed description and upon reference to the drawings, in which.

DETAILED DESCRIPTION OF THE INVENTION

Figure 1:
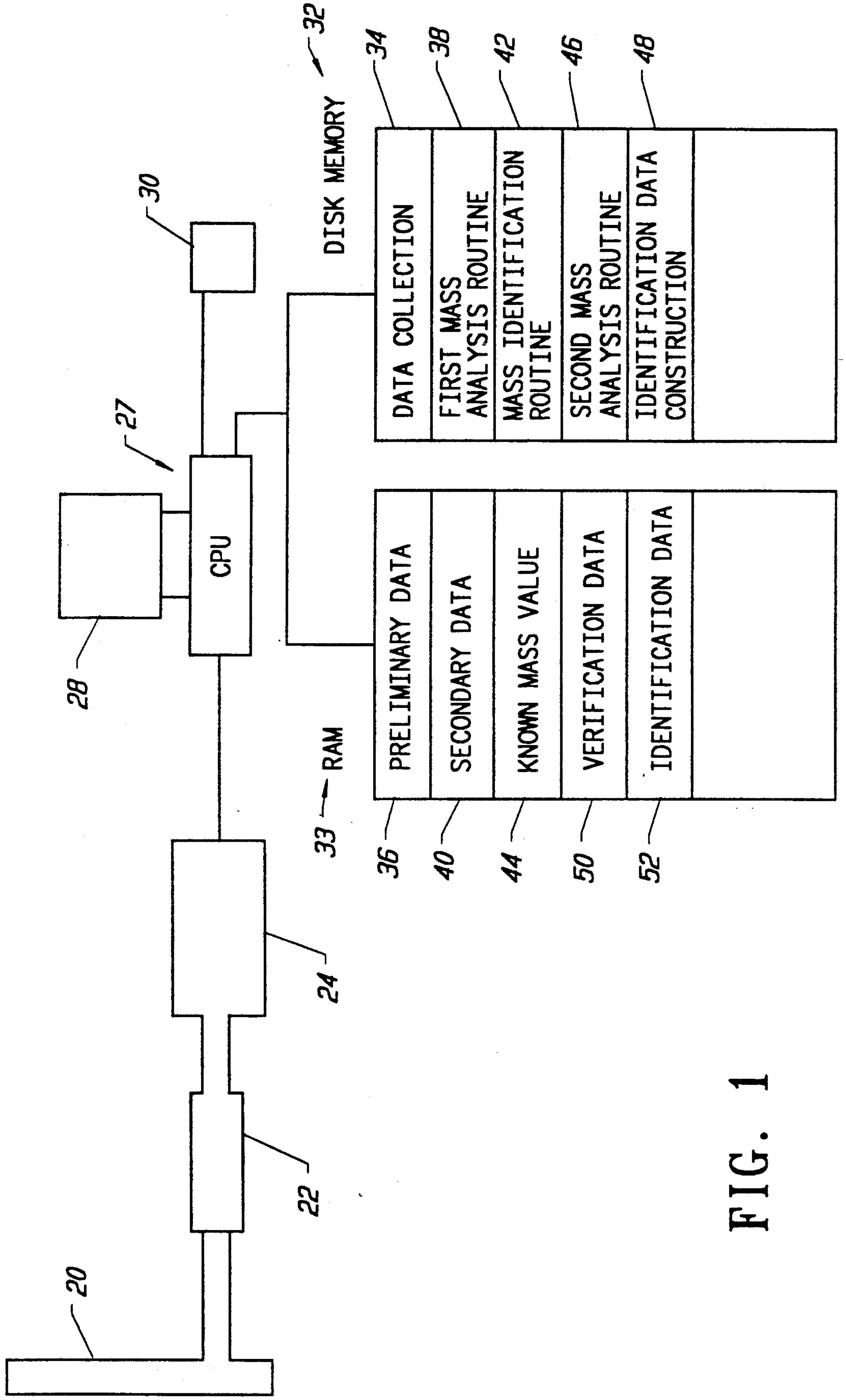
FIG. 1 is a schematic view of the mass spectrometry apparatus utilized in accordance with the present invention.

Turning now to the drawings, wherein like components are designated by like reference numerals in the various figures, attention is initially directed to FIG. 1. FIG. 1 provides a schematic representation of the mass spectrometry apparatus 10 utilized in accordance with the present invention. The mass spectrometry apparatus 10 includes liquid sample introduction device 20, holding a mass sample in solution. From introduction device 20 the sample enters multiple charging apparatus 22. The resultant charged sample then enters mass spectrometer 24 where it is analyzed. The analog output from mass spectrometer 24 is digitized with an analog to digital converter and sent to data system 26.

The data system 26 includes a CPU 27, a video monitor 28, and a peripheral device 30, such as a printer. CPU 27 is interconnected to disk memory 32 and RAM 33. A data collection routine 34, stored on disk memory 32, accumulates preliminary data 36 which is then stored within RAM 33.

First mass analysis routine 38 is stored on disk memory 32. This routine generates and stores secondary data 40 within RAM 33. Mass identification routine 42 scans selected data to identify a parent mass within the solution. The parent mass value 44 is then stored in RAM 33.

Thereafter, second mass analysis routine 46 invokes identification data construction 48, the resultant verification data 50 and identification data 52 are stored in RAM 33. Mass identification routine 42 is invoked once again and the process is repeated until all masses in the chemical mixture are identified.

Having provided a broad and general overview of the apparatus and method utilized in accordance with the present invention, attention turns to the details associated with the present invention.

Introduction device 20 is preferably an infusion device or a liquid chromatography apparatus as is well known in the art. Multiple charging apparatus 22 is preferably an electrospray apparatus which is also known in the art. Mass spectrometer 24 is also well known in the art. Similarly, data collection routine 34 may be any routine well known in the art.

The data received by data collection routine 34 is preliminary data 36 comprising intensity measurement values as a function of mass/charge or m/z ratios, generated by mass spectrometer 24. This preliminary data 36 may be plotted as mass/charge spectrum data.

Figure 2:
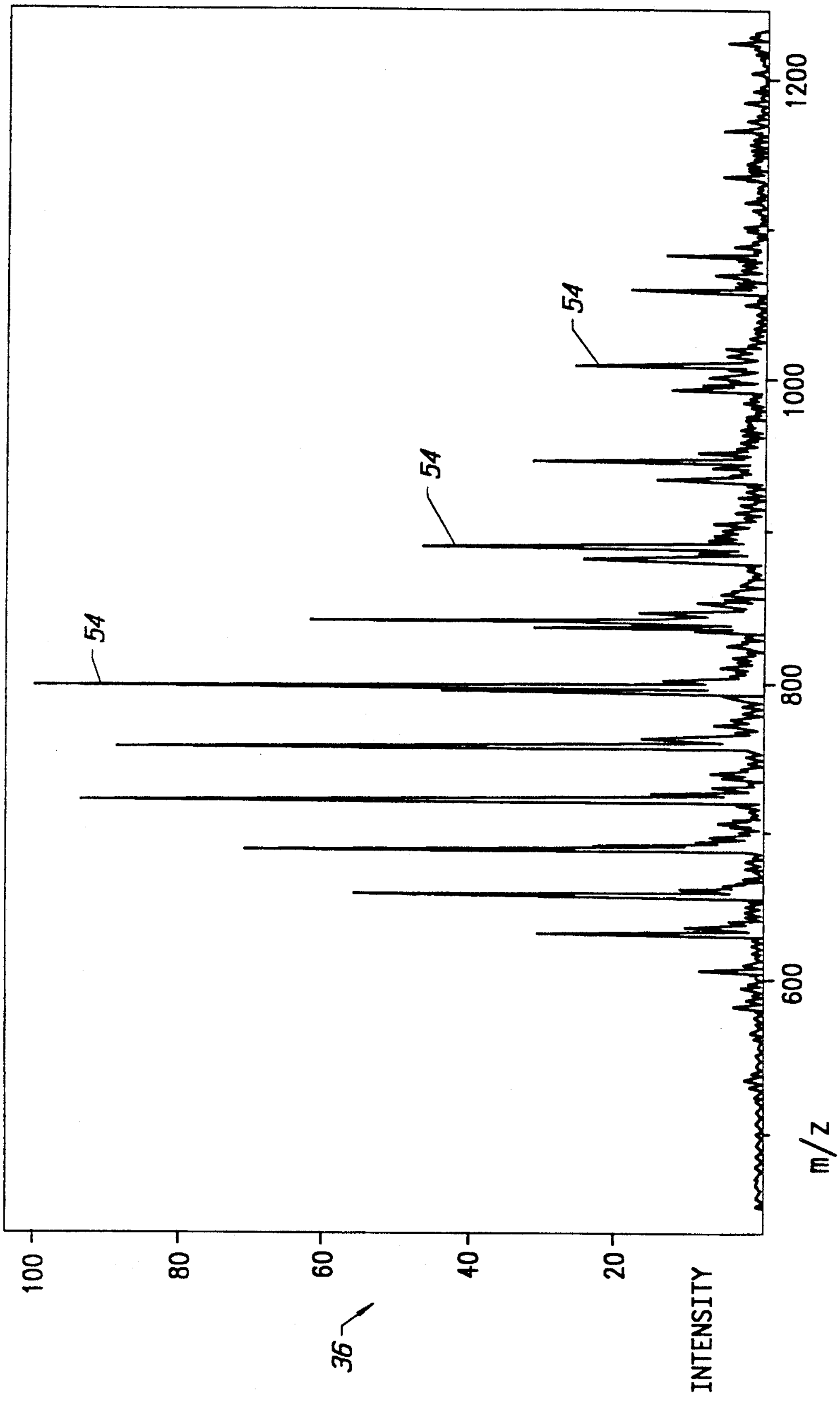
FIG. 2 is a representative plot of intensity versus mass/charge ratios for Volga Hemoglobin.

FIG. 2 depicts a plot of preliminary data 36 for Volga Hemoglobin. The plot includes a number of peaks 54. Most preliminary data 36 accumulated in this manner has characteristics similar to those depicted in FIG. 2. The positioning of the peaks approximates a gaussian distribution. The width generally approximates 500 on the m/z scale. This distribution is often centered at a value between 800 and 1200. The individual peaks 54 represent individual constituent ions. The number of charges on the constituent ion for each peak differs from an adjacent peak by one elementary charge. Each charge is attributable to an adduct cation from the original solution.

As discussed above, Fenn, et al. have done considerable work in interpreting preliminary data 36. Fenn provides a first mass analysis routine 38 according to the following function:

$$F(M^*) = \sum_{i=1}^{\infty} f(M^*/i + ma)$$

Fenn, et al. explain that F is the transformation function for which the argument M* is any arbitrarily chosen mass value M for which the transformation function F is to be evaluated. The symbol f represents the distribution function for the preliminary data; ma is the adduct ion mass; and i is an integer index for which the summation is performed. The function F has its maximum value when M* equals the actual value of M, in other words, the parent mass of the ions of the peaks in the sequence. The first mass analysis routine 38 evaluates F at a sequence of mass values M*, within a certain range, and thereby generates a set of values herein called secondary data. In the secondary data, the peak with the first maximum height corresponds to the mass of a molecule in the chemical mixture being analyzed.

Figure 3:
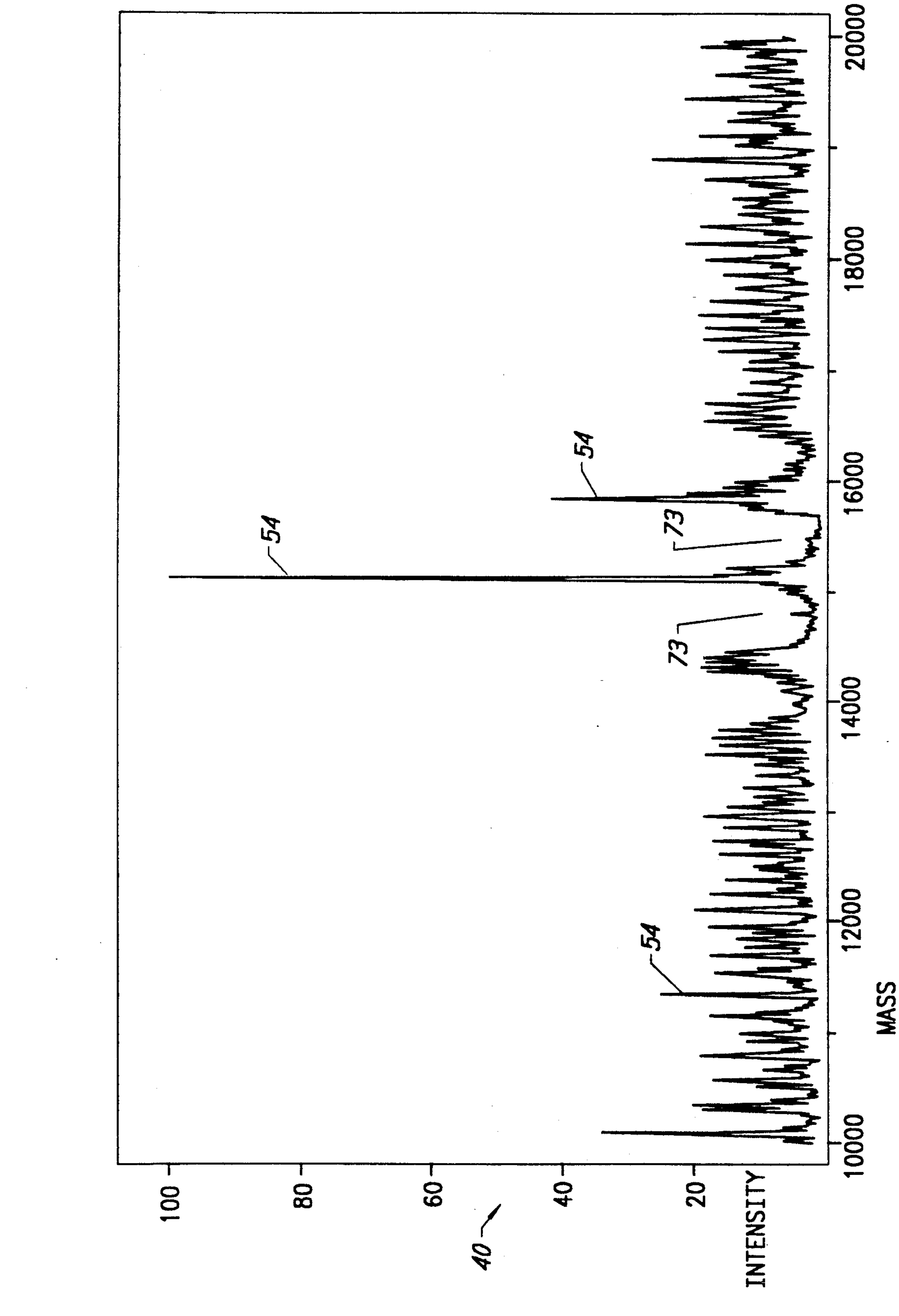
FIG. 3 is a representative plot of intensity versus mass achieved after performing a first mass analysis routine.

Such secondary data 40 is depicted in FIG. 3. That is, the figure depicts the results of first mass analysis routine 38 on the preliminary data 36 to form secondary data 40. The secondary data includes a number of peaks 54, however, a primary peak 54 is positioned at 15129, corresponding to the molecular weight of the alpha amino acid chain of Volga Hemoglobin.

Thus, Fenn et al have provided an advance in the art by allowing the determination of a "parent mass" of multiply charged ions by visual interpretation of secondary data 40, as in FIG. 3. On the other hand, the resultant secondary data 40 includes a number of peaks. It is difficult to determine whether these peaks 54 are a result of artifact noise or represent a plurality of distinct molecular masses. The present invention solves this problem by eliminating spurious data and thereby allowing further analysis of molecular mass information.

Figure 4:
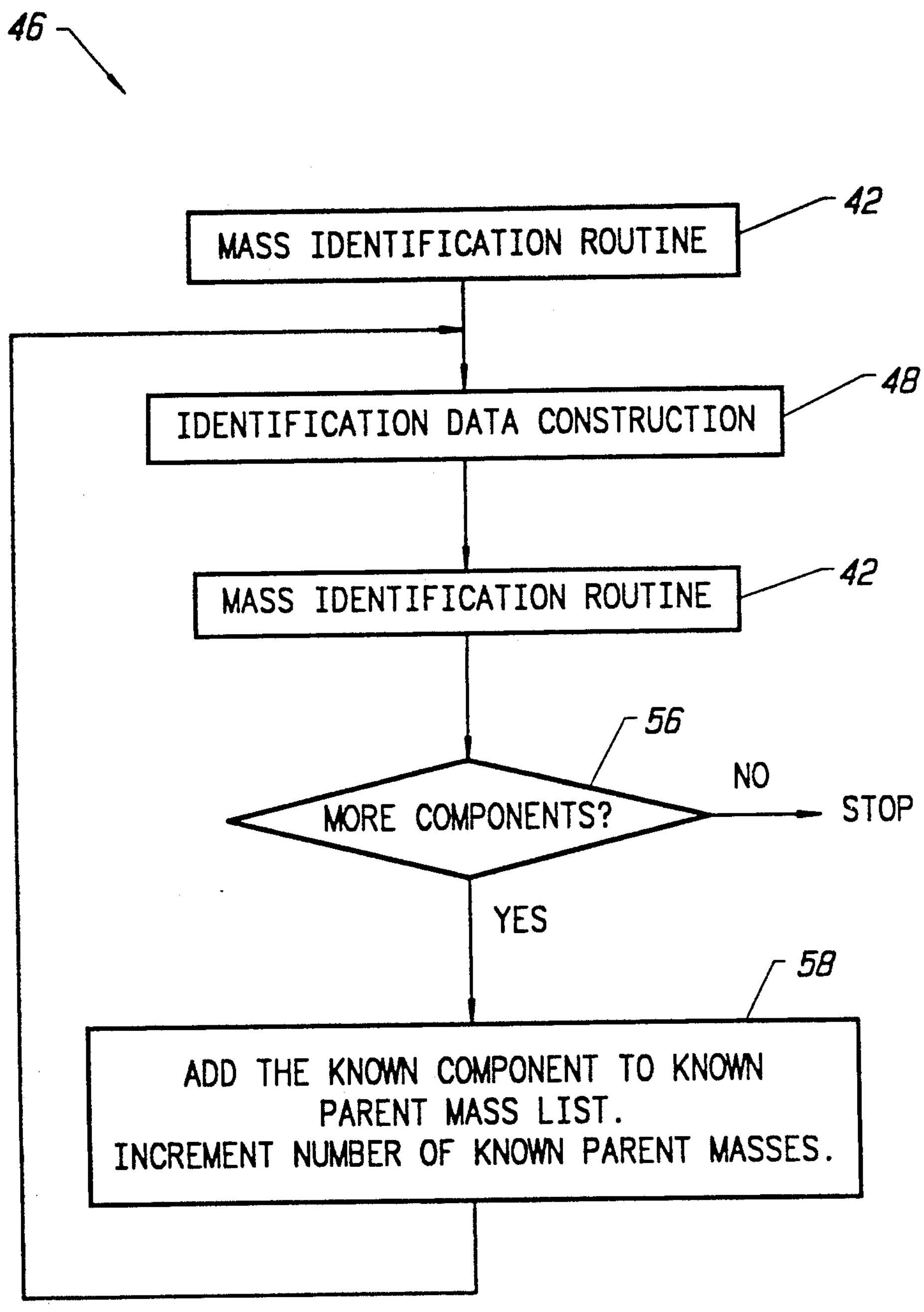
FIG. 4 is a flow chart representing the steps performed in a second mass analysis routine.

FIG. 4 depicts a flow diagram of second mass analysis routine 46 in accordance with the present invention. By way of overview, the second mass analysis routine relies upon known masses to generate revised mass data (identification data) free from spurious values. This data is then scanned to identify additional known masses. The known masses are used to help generate revised sets of mass data which further eliminates spurious values.

More specifically, the procedure begins with a mass identification routine 42. An identification data construction step 48 is then invoked, as to be more fully described herein, to generate identification data 52. Mass identification routine 42 scans the resultant identification data 52 in order to identify parent masses. Decision point 56 is then reached, if additional masses are found through the mass identification routine 42, incremental stage 58 is encountered, otherwise the procedure stops. At incremental stage 58 the identified parent mass is added to known mass values 44 and a stored value representing the number of parent masses is incremented. The routine 46 is then repeated.

Mass identification routine 42 scans selected data to identify parent masses. For instance, when scanning secondary data 40 or identification data 52 mass identification routine 42 identifies peak values, the corresponding molecular weight for such peak values is identified and therefore defines a parent mass. A mass may be identified in another manner. A parent mass may also be represented by a sequence of peaks of equal height in the secondary data or identification data, depending on the mass range. In this situation, the distance between peaks is equal to the parent mass.

Thus, in second mass analysis routine 46, after a parent mass has been identified, identification data construction 48 is invoked. The identification data is transformed secondary data. That is, the secondary data is reproduced without spurious mass information. This information is eliminated by relying upon known mass values, as to be more fully described at this time.

Figure 5:
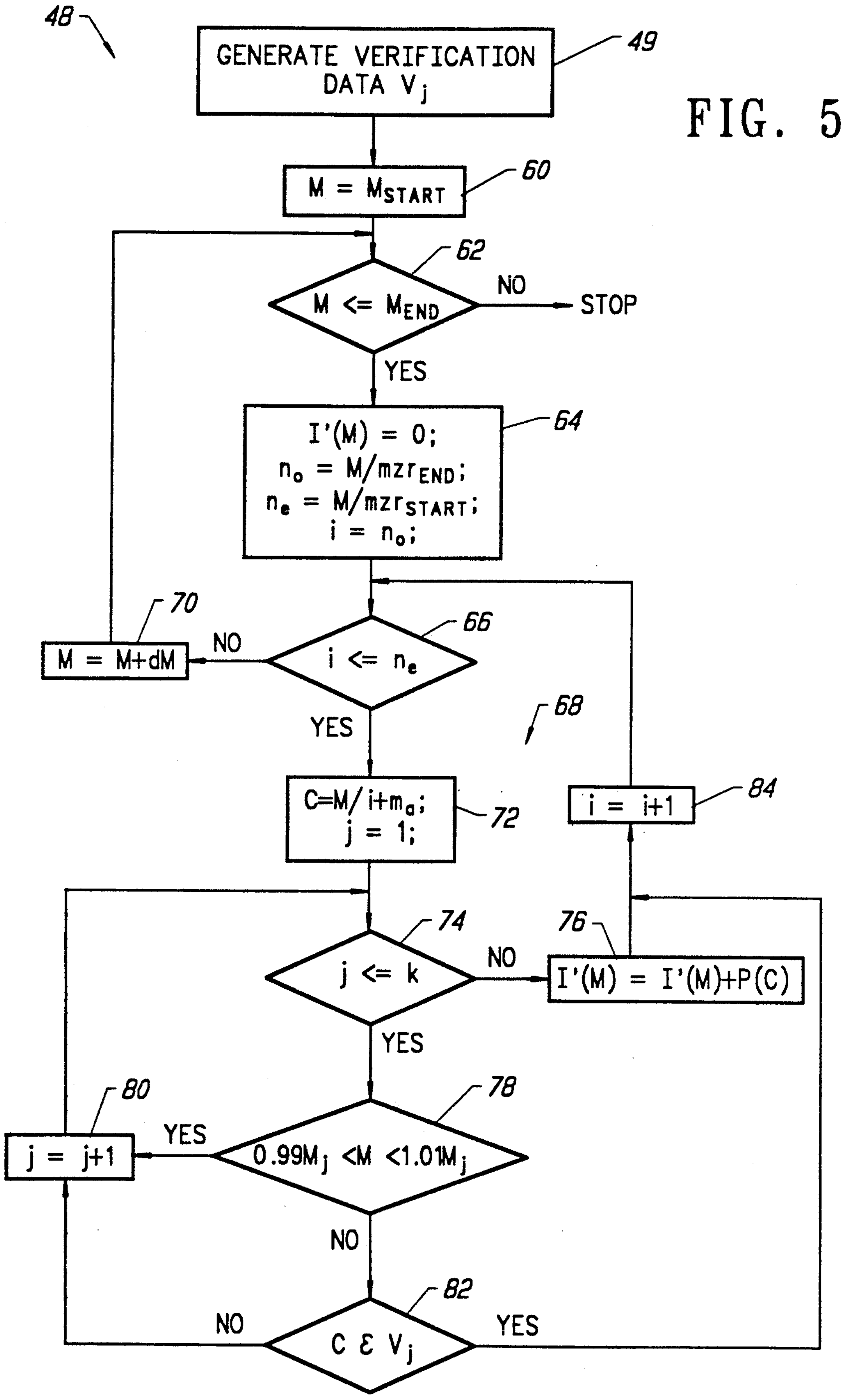
FIG. 5 is a flow chart representing the steps performed in identification data construction.

The second mass analysis routine is fully disclosed in FIG. 5. The nomenclature utilized in this routine is as follows:

$V_j$= verification data, also referred to as first m/z ratios for each known $M_j$ $(1<=j<=k)$
$M_j$= known parent mass j $(0<=j<=k)$
K= number of known parent masses
M= mass value from secondary data
dM= mass step size of secondary data
$M_{start}$= starting mass value of secondary data
$M_{end}$= ending mass value of secondary data
P(m/z)= Preliminary data, also referred to as mass/charge spectrum data
S(M)= Secondary data, also referred to as mass spectrum data
I'(M)= Identification data, also referred to as identification spectrum data
$mzr_{end}$= ending m/z of preliminary data
$mzr_{start}$= starting m/z of preliminary data
C= comparison datum, also referred to as second m/z ratio
$m_a$= adduct ion mass
i=integer The first step of second mass analysis routine 48 is a verification data calculation 49. This step involves generating a set of m/z ratio values from each known parent mass $M_j$, by dividing each known parent mass $M_j$ by a range of integers (i) and adding an adduct ion mass. Mathematically: $V_j=(M_j/2+m_a, M_j/3+m_a, M_j/4+m_a, M_j/5+m_a \ldots)$. This verification data 50 corresponds to the m/z values in the preliminary data 36 for known parent masses. A more sophisticated method for defining multiply charged ion series may be employed.

After the verification data 50 is calculated, M assumes the value of the starting mass of the secondary data 40, at block 60. This is the first step in testing all of the mass values in the secondary data. Decision branch 62 determines whether every mass in the secondary data has been considered. If so, then second mass analysis routine 48 is completed; otherwise, the routine advances to initialization block 64. In block 64, the identification data function I'(M) is set to zero for the given mass value M. The value $n_o$ is set equal to the quotient of the mass value M divided by the ending m/z value of the preliminary data 36, $mzr_{end}$. The value $n_e$ is set equal to the quotient of the mass value M divided by the starting m/z value of the preliminary data 36, $mzr_{start}$. Since $n_o$ and $n_e$ represent a range of charge values, $n_o$ and $n_e$ are rounded down and up, respectively, to generate integer values. Then index value i is set equal to $n_o$.

Decision block 66 will proceed to summing routine 68 as long as the value of i is smaller than or equivalent to the value of the ending charge $n_e$ from the preliminary data 36. If this condition is not met, the mass value M is incremented at 70. Through this incrementation step 70, all masses of the secondary data 40 are processed.

Summing routine 68 includes steps 72 through 84. This routine generates identification data in two circumstances. First, when a tested mass is close to a known parent mass, peaks from the preliminary data are summed to regenerate a peak for the known mass. Next, when the tested mass is not a known parent mass and the computed m/z ratios for that mass do not correspond to the verification data, preliminary data is summed to regenerate the mass information. Thus, preliminary data for a tested mass which is unknown but which corresponds to the verification data is not included in the identification data. This routine is more fully appreciated by the following description.

At step 72 a comparison value, C, is created and j is initialized to a value of 1. The comparison value, C, is set equal to the quotient of the incremental mass M divided by integer i plus an adduct ion mass ma. The routine advances to decision block 74 where j is compared to the number of known parent masses, K. Since j was just initialized to a value of 1, on this first pass the step will advance to decision block 78.

Block 78 tests whether incremental mass M is within 1% of a known parent mass. Complete identity to a known parent mass is not required. A 1% window is used because characteristically the region immediately around a parent peak in secondary data 40 is free from artifacts or background noise. This artifact free region 73 is depicted in FIG. 3. While a 1% value is preferred, an alternate value may also be used to satisfy the particular interests of the user.

If mass M is within this 1% range, the incremental mass M is considered to be a known parent mass, herein called an identified mass. Thus, j is incremented at block 80 and block 74 is invoked once again. Block 74 will lead to block 78 until the mass M has been compared to each identified mass $M_j$ $(j<=K)$. After mass M has been compared to each identified mass $M_j$, block 76 is invoked.

At block 76 the identification data 52, I'(M), assumes the previous value for I'(M) plus the value from preliminary data at the ratio C, P(C). At block 84 i is incremented and the routine returns to block 66. At block 72 the same mass M is divided by i, forming a ratio which differs from the previous value of C by one elementary charge.

Wherever M corresponds to a known parent mass, routine 68 will sum individual peaks from the preliminary data 36 at block 76 to regenerate a peak in the identification data 52.

Returning to decision block 78, if the mass value is not within 1% of this central peak, or known parent mass, then comparison data C is tested against verification data $V_j$ to determine whether C matches any of the m/z values in $V_j$ (block 82). An exact match is not required. A comparison value, C, may be said to match or to be equivalent to a $V_j$ value if it is within $W_{Daltons}$. The window, W, is typically specified in units of "Daltons" where one Dalton is the mass of carbon divided by twelve. A typical window size would be one to three Daltons.

If a match is not found, block 76 will eventually be reached where data will be summed, as previously described. However, the data summed in this instance does not correspond to a known parent mass.

If a match is identified at block 82, the summing step at block 76 is skipped. Consequently, if comparison data, C, corresponds to verification data 50, but is not a known parent mass, then this data is not added to the identification data 52.

Thus, the summing routine 68 tests to determine whether a test mass M is within 1% of a known parent mass. If it is, then the preliminary data peak associated with that parent mass is regenerated in the identification data 52 so long as that peak does not overlap with other parent masses. The identification data does not include those preliminary data values corresponding to the verification data 50 but not representing a known mass. Therefore, valuable mass information is preserved while background noise and artificial side peaks are eliminated from those portion of the secondary/identification data which do not correspond to known parent masses.

Figure 6:
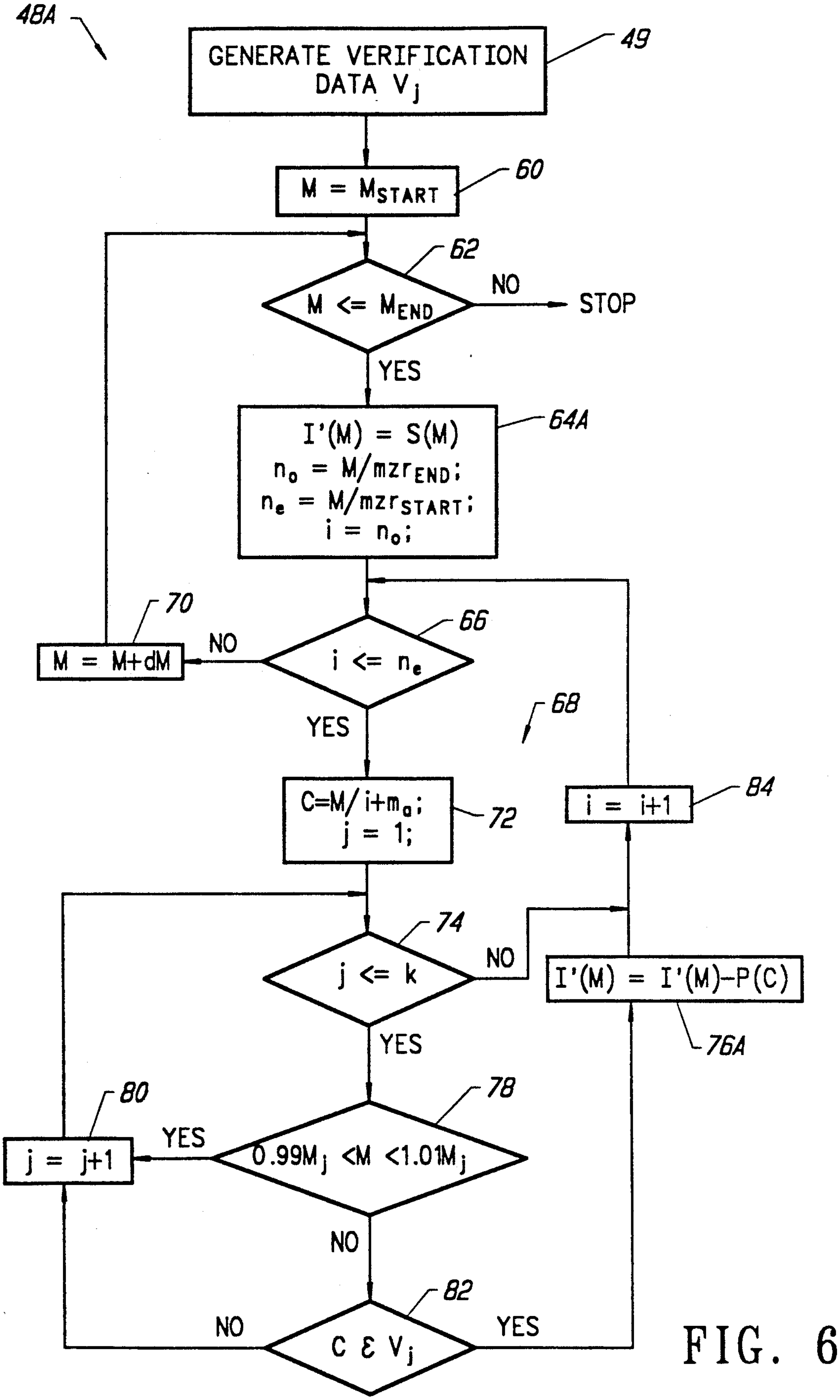
FIG. 6 is a flow chart representing the steps performed in an alternate embodiment of identification data construction.

Turning now to FIG. 6, an alternate second mass analysis routine 48A is presented. The steps are largely the same, therefore, attention focuses on the modifications of this approach. In initialization block 64A, identification data I'(M) assumes the corresponding value of the secondary data, denoted as S(M). In this embodiment, if the mass value M is within the 1% range of the parent mass, then the identification data is left unchanged. The relevant information is already present since I'(M) has been assigned the S(M) value. On the other hand, if the mass value M is not within the 1% range and it has a m/z value matching any verification data value, then the corresponding intensity value from the preliminary data P(C) is subtracted from the identification data. Thus, in this approach, the secondary data is modified by subtracting out those preliminary data values which correspond to verification data 50 but do not correspond to a known mass. Thus, as above, the resultant identification data 52 has eliminated background noise and artificial side peaks.

Figure 7:
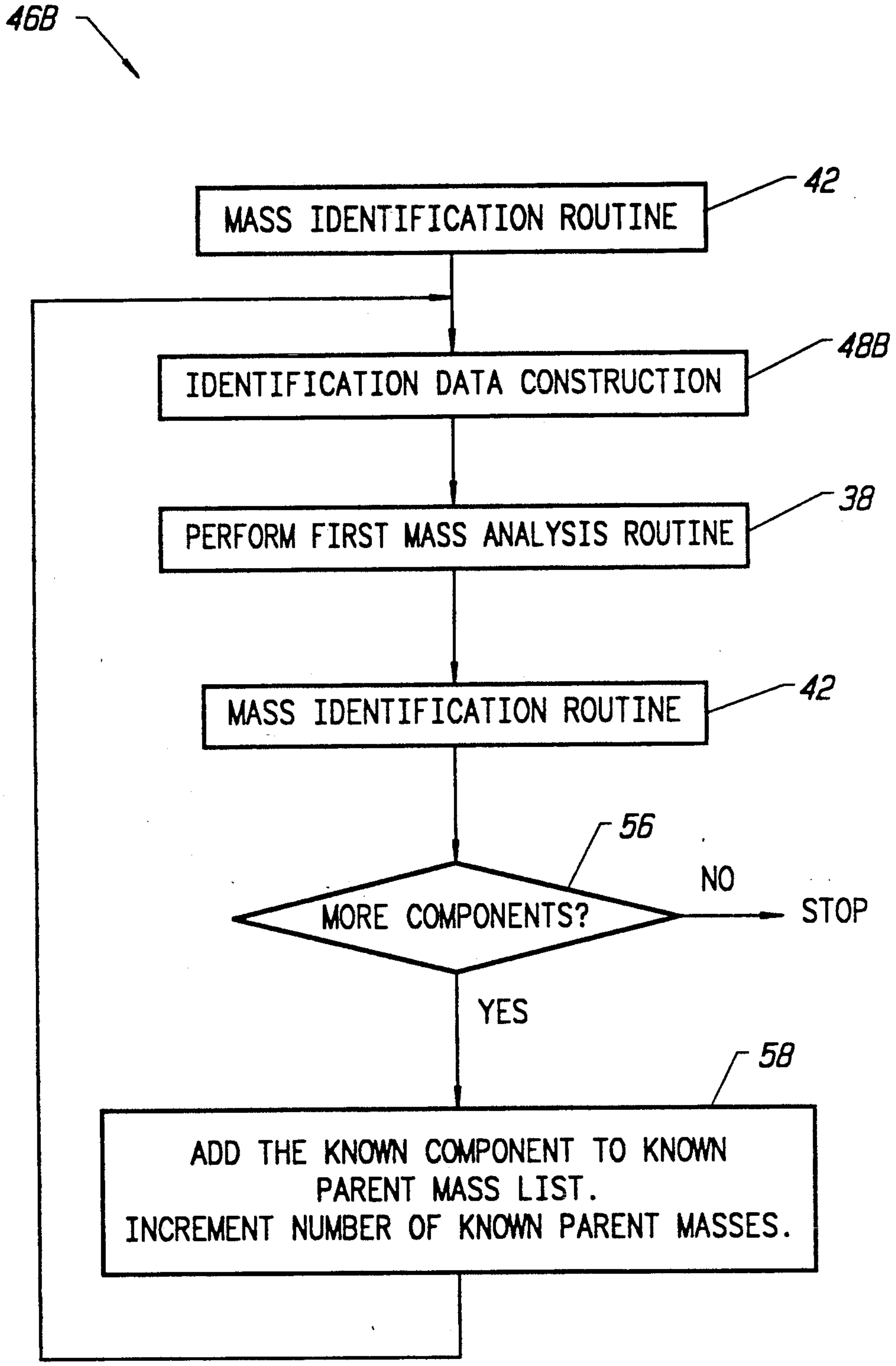
FIG. 7 is a flow chart representing the steps performed in an alternate embodiment of second mass analysis routine.

Turning now to FIG. 7, second mass analysis routine 46B, another embodiment of the present invention, is disclosed. Once again, many steps are identical to the embodiment associated with FIG. 4. Attention therefore focuses upon the modifications.

A modified identification data construction step 48B is provided. The steps associated with this routine are more fully disclosed in FIG. 8. The same nomenclature is employed as in the previous embodiments. Two new variables are introduced: $T_{mzr}$ and $Intensity_{min}$. $T_{mzr}$ represents a temporary mass to charge ratio. $Intensity_{min}$ is a minimum intensity level, chosen by the user, for m/z values to be considered a peak 54. Thus, by reference to FIG. 2, one may set $Intensity_{min}$ to a value of 10 to include all of the major peaks 54.

Block 49 involves the generation of verification data 50, as in the prior embodiments of the invention. $T_{mzr}$ is initialized in block 88 to $mzr_{start}$, which is the starting m/z value of the preliminary data. Decision block 90 tests whether all of the m/z values from the preliminary data have been processed. Until all values have been processed, identification data $I'(T_{mzr})$ assumes the value of the preliminary data for that m/z value, as depicted at block 92.

At block 93 $I'(T_{mzr})$ is checked to verify whether it is a value above $intensity_{min}$, thus determining whether it is a peak 54 of preliminary data 36. If the value does not correspond to a peak, the peak is reproduced in the identification data 52 since the identification data 52 has been assigned the preliminary data 36 value in box 92. If the value does correspond to a peak, decision block 94 checks to determine whether $T_{mzr}$ is within the verification set. If $T_{mzr}$ is not within the verification set, once again the identification data 52 will reproduce the preliminary data value 36, since that value was assigned in box 92. If $T_{mzr}$ does result in a match, block 96 assigns a value of zero to the identification data 52. In an alternate embodiment, the identification data may be assigned the value of $intensity_{min}$. Thus, all the peaks in the preliminary data which are greater than the threshold and correspond to known masses are removed.

After this identification data is formed, the identification data 52 is subjected to first mass analysis routine 38, as previously described. The resultant data is then subject to mass identification routine 42. If this step results in the discovery of additional components, incremental stage 58 is once again encountered, as previously described.

Figure 9:
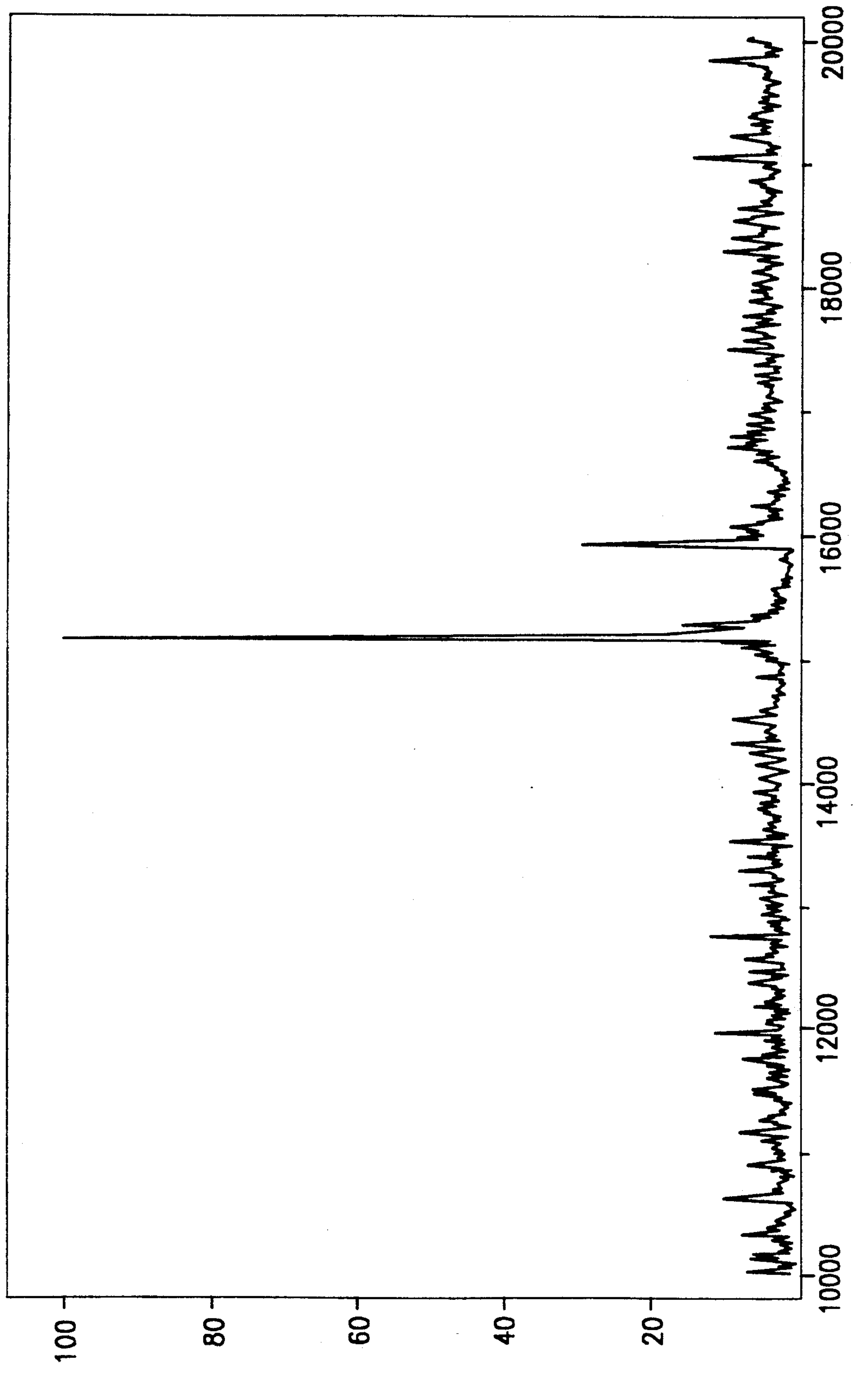
FIG. 9 is a representative plot of intensity versus mass achieved after performing one iteration of second mass analysis routine.

After one iteration, the first and second embodiments of the invention disclosed herein will produce data as displayed in FIG. 9. This data again represents volga hemoglobin. FIG. 9 has eliminated spurious mass information which is included in FIG. 3. Thus, the peaks that remain in FIG. 9 may be reliably associated with mass values, not simply interference from an identified mass.

Figure 10:
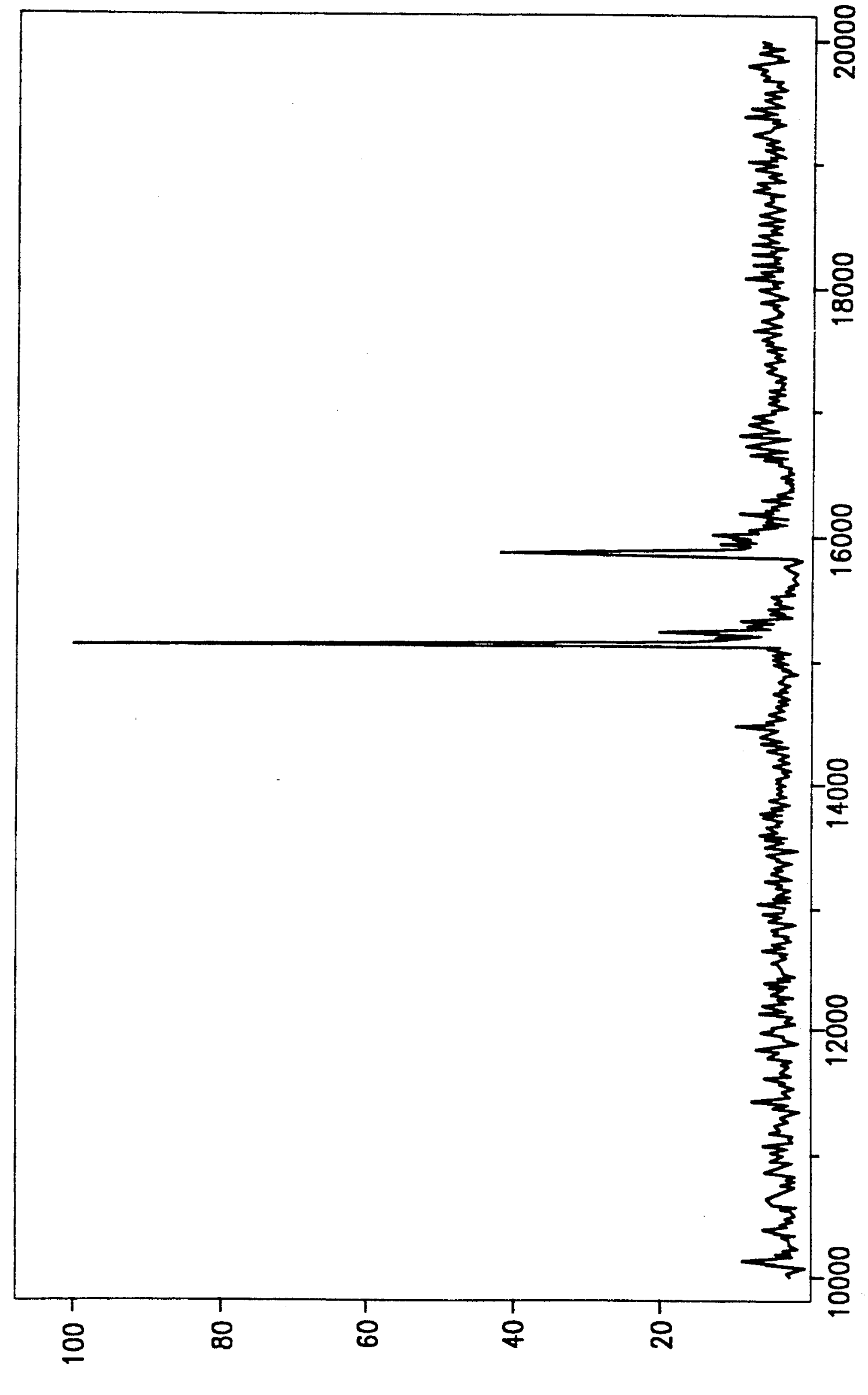
FIG. 10 is a representative plot of intensity versus mass achieved after performing a second iteration of second mass analysis routine.

FIG. 10 represents identification data after two iterations of the first and second embodiments of the invention. FIG. 10 has eliminated spurious mass information which is included in FIG. 9. The process of eliminating spurious information continues with each iteration.

Figure 8:
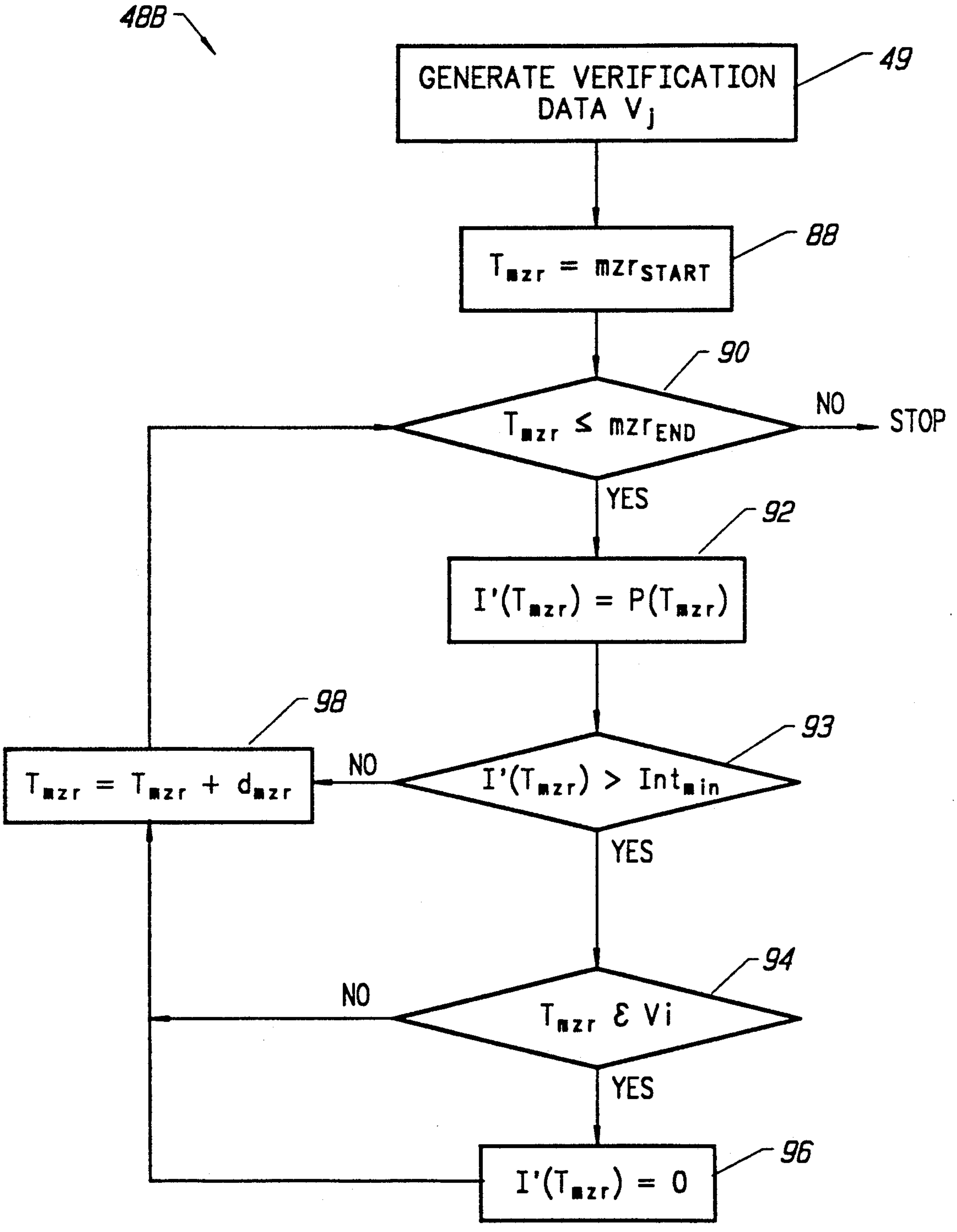
FIG. 8 is a flow chart representing the steps performed in identification data construction in accordance with the alternate embodiment of second mass analysis routine of FIG. 8.

Identification data produced by the third embodiment of the present invention, FIG. 8, would be similar to FIGS. 9 and 10. The major difference would be that the salient peaks associated with identified masses would not be present.

Thus, it is apparent that there has been provided, in accordance with the invention, a method for interpreting mass spectra of multiply charged ions of mixtures that fully satisfied the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. A method for identifying the molecular masses of ions with varying numbers of charges, wherein said ions are identified from preliminary data representing intensity values corresponding to m/z ratios for said ions, a list of one or more mass values corresponding to one or more molecules known to be present in said mixture, a first set of m/z ratios corresponding to said known molecules, and a second set of m/z ratios corresponding to a range of mass values, said method comprising the steps of:

a) computing and storing identification data by comparing said first and second sets cf m/z ratios, assigning values to said identification data corresponding to said range of mass values from said preliminary data when said ratios are not equivalent, and storing said identification data in a computer memory;

b) scanning said identification data in said memory to identify a molecular mass and storing said molecular mass with said list of known mass values; and c) repeating steps (a) and (b) under computer control to identify a plurality of said molecular masses.

2. The method of claim 1 wherein each of said first m/z ratios represents the sum of an adduct ion mass and the quotient of a known mass value divided by an integer.

3. The method of claim 1 wherein said range of mass values corresponds to secondary data representing mass values for said ions and each of said second m/z ratios represents the sum of an adduct ion mass and the quotient of a mass value from said secondary data divided by an integer.

4. The method of claim 1 wherein each value assigned by said step of assigning values to said identification data comprises a sum of intensity values from said preliminary data corresponding to a range of m/z ratios for one mass value.

5. A method for identifying the molecular masses of ions with varying numbers of charges, wherein said ions are identified from preliminary data representing intensity values corresponding to m/z ratios for said ions, a list of one or more mass values corresponding to one or more molecules known to be present in said mixture, a first set of m/z ratios corresponding to said known molecules, and a second set of m/z ratios corresponding to a range of mass values, said method comprising the steps of:

a) computing and storing identification data, for mass values corresponding to said known mass values, by assigning values to said identification data from said preliminary data;

b) computing and storing identification data, for said range of mass values not corresponding to said known masses, by comparing said first and second m/z ratios and assigning a value to said identification data from said preliminary data when said ratios are not equivalent;

c) scanning said identification data in said memory to identify a molecular mass and storing said molecular mass with said list of known mass values; and d) repeating steps (a), (b), and (c) under computer control to identify a plurality of said molecular masses.

6. The method of claim 5 wherein each of said first m/z ratios represents the sum of an adduct ion mass and the quotient of a known mass value divided by an integer.

7. The method of claim 5 wherein said range of mass values corresponds to secondary data representing mass values for said ions and each of said second m/z ratios represents the sum of an adduct ion mass and the quotient of a mass value from said secondary data divided by an integer.

8. A method for identifying a plurality of molecules in a chemical mixture where said molecules are multiply charged ions, said molecules being identified from preliminary data representing intensity values corresponding to mass/charge values of said ions, secondary data representing intensity values corresponding to a defined range of mass values of said ions, molecular weight data corresponding to one or more identified molecules, said molecules being identified by their associated mass values, said primary, secondary and molecular weight data being stored in a memory of a computer, said method comprising the steps of:

(a) computing verification data corresponding to said mass values of said identified molecules, each divided by a first set of integers, and storing said verification data in said memory;

(b) computing comparison data corresponding to said mass values of said secondary data each divided by a second set of integers;

(c) generating identification data by:

i) accumulating in said memory identification datum values comprising sums of said preliminary data for each mass value of said secondary data corresponding to said identified molecules; and ii) comparing said comparison data to said stored verification data for each mass value of said secondary data not corresponding to said identified molecules, and accumulating in said memory identification datum values for each mass value of said secondary data comprising sums of said preliminary data when said comparing does not result in a matched value;

(d) identifying molecules by scanning said identification data in said memory to identify peak values, associating said peak values with their mass values and storing said mass values with said molecular weight data; and (e) repeating steps (a) through (d) under computer control to identify a plurality of said molecules.

9. A method of storing and analyzing in a computer memory m/z ratios for a chemical mixture containing a plurality of unknown molecule types, each of said molecule types having an associated mass, where each of said molecule types is represented in said mixture by multiply charged ions with a range of m/z values, said method comprising the steps of:

a) measuring and storing m/z intensity values for a defined range of m/z values;

b) identifying an initial set of molecule types known to be present in said chemical mixture and a corresponding set of known mass values;

c) computing and storing in said computer memory a set of m/z ratios corresponding to each of said known molecule types;

d) forming sums of said m/z intensity values for each mass value in a defined range of mass values, each sum comprising a sum of said m/z intensity values for a set of m/z ratios for said corresponding mass, wherein said sum for each mass value not corresponding to said known molecule types includes only said m/z intensity values which do not correspond to said known m/z ratios of said known molecule types;

e) identifying peak values from said sums and adding a mass value corresponding to each said peak to said set of known mass values; and f) repeating said steps (c) through (e) under computer control to identify a plurality of said mass values.

10. A method for identifying molecules in a chemical mixture, said method utilizing a multiple charging apparatus, a mass spectrometer, and a computer, the method comprising the steps of:

(a) conveying said chemical mixture to a multiple charging apparatus, where multiply charged ions are formed;

(b) conveying said multiply charged ions to a mass spectrometer which generates mass/charge spectrum data relating intensity to a range of mass/-charge values;

(c) storing said mass/charge spectrum data in a computer;

(d) processing said mass/charge spectrum data to generate mass spectrum data relating intensity to a range of mass values, and storing said mass spectrum data;

(e) identifying and storing a set of known masses in said chemical mixture by interpreting peak values in said mass spectrum data;

(f) generating a list of mass/charge ratios for each of said identified masses and storing said list;

(g) computing a range of mass/charge ratios for each mass value of said mass spectrum data;

(h) computing identification spectrum data by assigning a value to said identification spectrum from said mass/charge spectrum data (1) for said mass/charge spectrum data corresponding to said known masses, and (2) for said mass/charge spectrum data which does not correspond to said known masses and which does not correspond to a value in said list;

(i) identifying mass values associated with peak intensity values of said identification spectrum;

(j) storing said identified mass values; and (k) repeating steps (f) through (j) under computer control to identify a plurality of said mass values.

11. The method of claim 10 wherein said multiple charging apparatus is an electrospray apparatus.

12. A method for identifying a plurality of molecules in a chemical mixture where said molecules are multiply charged ions, said molecules being identified from preliminary data representing intensity values corresponding to mass/charge values of said ions, secondary data representing intensity values corresponding to a defined range of mass values of said ions, molecular weight data corresponding to one or more identified molecules, said molecules being identified by their associated mass values, said primary, secondary and molecule data being stored in a memory of a computer, said method comprising the steps of:

(a) computing verification data corresponding to said mass values of said identified molecules each divided by a first set of integers, and storing said verification data in said memory;

(b) computing comparison data corresponding to said mass values of said secondary data each divided by a second set of integers;

(c) generating identification data by assigning said secondary data as said identification data and subtracting therefrom preliminary datum intensity values which do not correspond to said identified molecules but form a match with said verification data;

(d) identifying a molecule by scanning said identification data in said memory to identify a peak intensity value, associating said peak value with its mass value, and storing said mass value with said molecular weight data; and (e) repeating steps (a) through (d) under computer control to identify a plurality of said molecular masses.

13. A method for identifying a plurality of molecules in a chemical mixture where said molecules are multiply charged ions, said molecules being identified from preliminary data representing intensity values corresponding to mass/charge values of said ions, said preliminary data being stored and analyzed in a computer, said method comprising the steps of:

a) forming secondary data representing intensity versus mass values of said ions by forming sums of preliminary data values corresponding to a range of mass values;

b) identifying peak intensity mass values within said stored secondary data;

c) identifying known molecules based upon said peak intensity mass values and storing data corresponding to said known molecules;

d) computing and storing in said computer, verification sets of mass/charge ratios, corresponding to each of said known molecules;

e) generating and storing in said computer identification data by assigning said preliminary data as said identification data and then replacing said identification data with a value of zero for those identification datum intensity values corresponding to said verification sets of mass/charge ratios;

f) computing sums of identification data values corresponding to each of a range of mass values to form new secondary data;

g) identifying peak intensity mass values within said new secondary data;

h) repeating steps (c) through (g) under computer control to identify a plurality of molecules.

14. An apparatus for identifying the molecular masses of ions with varying numbers of charges, wherein said ions are identified from preliminary data representing intensity values corresponding to m/z ratios for said ions, a list of mass values corresponding to molecules known to be present in said mixture, a first set of m/z ratios corresponding to said known molecules, and a second set of m/z ratios corresponding to a range of mass values, said apparatus comprising:

a) transformation means for computing and storing identification data, said means comparing said first and second sets of m/z ratios, said transformation means assigning values to said identification data corresponding to said range of mass values from said preliminary data when said ratios are not equivalent, and said transformation means storing said identification data in a computer memory; and b) means for scanning said identification data in said memory to identify a molecular mass, said means storing said molecular mass with said known molecule data.

15. The apparatus of claim 14 wherein said range of mass values corresponds to secondary data representing mass values for said ions and each of said second m/z ratios represents the sum of an adduct ion mass and the quotient of a mass value from said secondary data divided by an integer.

16. The apparatus of claim 14 wherein each value assigned by said transformation means comprises a sum of intensity values from said preliminary data corresponding to a range of m/z ratios for one mass value.

17. An apparatus for identifying the molecular masses of ions with varying numbers of charges, wherein said ions are identified from preliminary data representing intensity values corresponding to m/z ratios for said ions, a list of one or more mass values corresponding to one or more molecules known to be present in said mixture, a first set of m/z ratios corresponding to said known molecules, and a second set of m/z ratios corresponding to a range of mass values, said apparatus comprising:

a) first means for storing said preliminary data, said list, said first m/z ratios, and said second m/z ratios;

b) second means for computing and storing identification data, for mass values corresponding to said known mass values, by assigning values to said identification data from said preliminary data;

c) third means for computing, and then storing in said memory, identification data for said range of mass values not corresponding to said known masses, said third means comparing said first and second m/z ratios and assigning a value to said identification data from said preliminary data when said ratios are not equivalent;

d) forth means for scanning said identification data in said memory to identify a molecular mass and storing said molecular mass in said memory with said list of known mass values; and e) means for controlling said first, second, third and forth means to identify a plurality of said molecular masses.

18. The apparatus of claim 17 wherein said range of mass values corresponds to secondary data representing mass values for said ions and each of said second m/z ratios represents the sum of an adduct ion mass and the quotient of a mass value from said secondary data divided by an integer.

19. An apparatus of storing and analyzing m/z ratios for a chemical mixture containing a plurality of unknown molecule types, each of said molecule types having an associated mass, where each of said molecule types is represented in said mixture by multiply charged ions with a range of m/z values, said apparatus comprising:

a) means for measuring and storing m/z intensity values for a defined range of m/z values;

b) means for identifying an initial set of molecule types known to be present in said chemical mixture and a corresponding set of known mass values;

c) first means for computing and storing a set of m/z ratios corresponding to each of said known molecule types;

d) second means for forming sums of said m/z intensity values for each mass value in a defined range of mass values, each sum comprising a sum of said m/z intensity values for a set of m/z ratios for said corresponding mass, wherein said sum for each mass value not corresponding to said known molecule types includes only said m/z intensity values which do not correspond to said known m/z ratios of said known molecule types;

e) third means for identifying peak values from said sums and adding a mass value corresponding to each said peak to said set of known mass values; and f) means for controlling said first, second, and third means to identify a plurality of said mass values.

20. The apparatus of claim 19 wherein said second means forms a sum of intensity values from said m/z ratios for said chemical mixture corresponding to a range of m/z ratios for one mass value.

* * * * *